J. HINKLEY.
TRIMMING MECHANISM FOR SEWING MACHINES.
APPLICATION FILED AUG. 1, 1910.

1,157,000.

Patented Oct. 19, 1915.
2 SHEETS—SHEET 1.

Witnesses
Grace P. Brereton
Albert Popkins

Inventor
James Hinkley
By Sturtevant Mason
Attorneys

J. HINKLEY.
TRIMMING MECHANISM FOR SEWING MACHINES.
APPLICATION FILED AUG. 1, 1910.
1,157,000.
Patented Oct. 19, 1915.
2 SHEETS—SHEET 2.
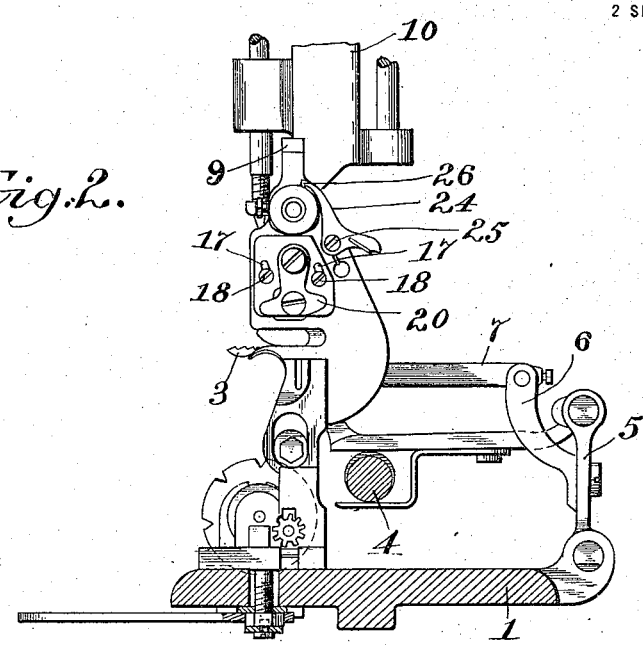
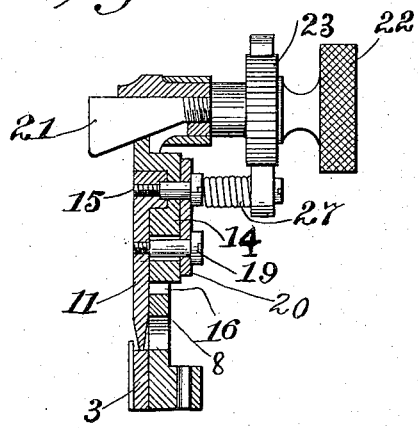
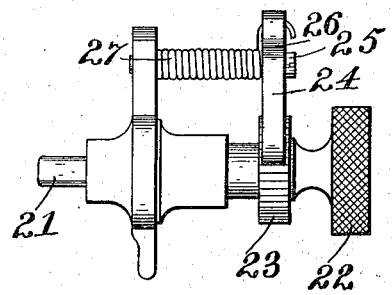
WITNESSES
Grace P. Brereton
Albert Popkins
INVENTOR
By James Hinkley
Sturtevant Mason
Attorneys

UNITED STATES PATENT OFFICE.

JAMES HINKLEY, OF HAGAMAN, NEW YORK, ASSIGNOR TO UNION SPECIAL MACHINE COMPANY, OF CHICAGO, ILLINOIS, A CORPORATION OF ILLINOIS.

TRIMMING MECHANISM FOR SEWING-MACHINES.

1,157,000.  Specification of Letters Patent.  Patented Oct. 19, 1915.

Application filed August 1, 1910. Serial No. 574,379.

*To all whom it may concern:*

Be it known that I, JAMES HINKLEY, a citizen of the United States, residing at Hagaman, in the county of Montgomery, State of New York, have invented certain new and useful Improvements in Trimming Mechanisms for Sewing-Machines, of which the following is a description, reference being had to the accompanying drawing and to the letters and figures of reference marked thereon.

The invention relates to new and useful improvements in trimmer mechanisms for sewing machines, and more especially to a trimmer of the character shown and described in the patent to Durand, No. 698,912, granted April 29th, 1902. In this patent the fabric is severed by toggle trimming members, which are provided with crushing or abrading surfaces coöperating one with the other to separate the material. In order that the fabric may be separated in this manner, considerable pressure is necessary between the trimming members. The patent describes means for adjusting the position of one trimming member relative to the other, whereby the separating pressure between the two members may be varied. It is found in practice that the mechanism for adjusting the trimmer members relative to each other in a device of this character is apt to work loose and render the trimmer ineffective to perform its trimming action.

An object of the present invention is to provide means whereby one trimming member may be adjusted relative to the other, and locked in its adjusted position.

A further object of the invention is to provide means for adjusting one trimmer relative to the other, which includes a device whereby graduated adjustments may be secured.

These and other objects will in part be obvious, and will in part be hereinafter more fully described.

Figure 1:
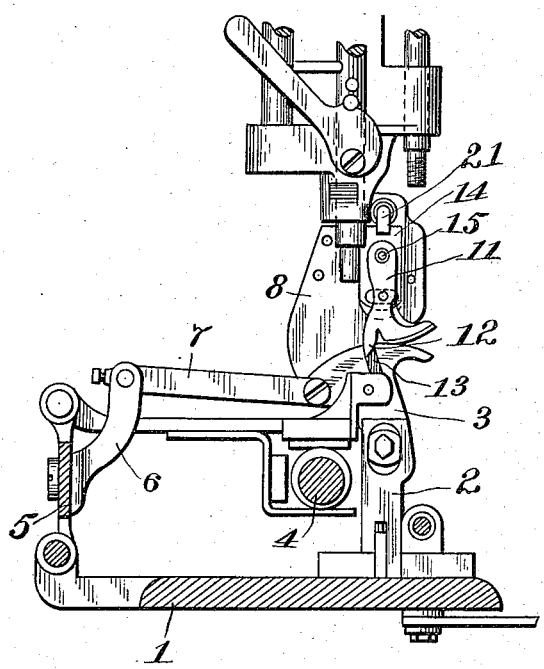
Figure 5:
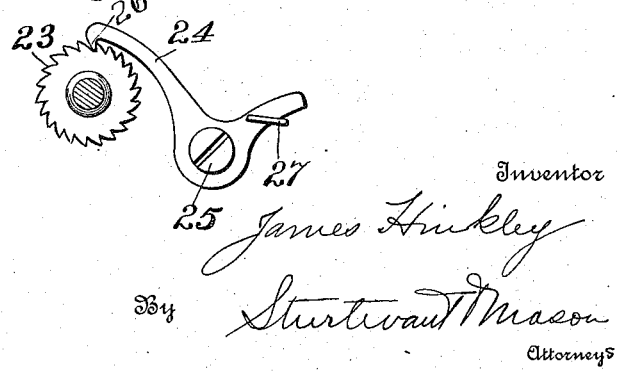

In the drawings which show by way of illustration one embodiment of the invention, Figure 1 is a side view of the trimming mechanism, the means for operating the same and the parts of the machine adjacent thereto; Fig. 2 is a similar view from the other side of the trimmer; Fig. 3 is a vertical section through the upper toggle trimmer, showing the adjusting means; and Fig. 4 is a detail showing the locking dog in plan view. Fig. 5 is a detail showing in side elevation the locking pawl and ratchet wheel for holding the nut in adjusted positions.

The bed plate 1 of the sewing machine carries a bracket 2, on which is pivoted the lower toggle 3 of the trimming members. The main shaft 4 is connected to a rock lever 5, and said rock lever in turn moves the feed dog back and forth in a well known manner. A bracket 6 is connected to the rock lever 5 and vibrates therewith. Said bracket at its upper end is pivotally connected to a link 7, which is pivoted at its other end to the toggle member 3. A bracket 8 is secured to the bed plate near its lower end, and is attached by means of an arm 9 at its upper end to the overhanging arm 10 of the machine.

The upper toggle member 11 is provided with a tooth 12, which engages a recess 13 in the lower toggle member 3, and as the lower toggle member is vibrated the upper toggle member 11 will be similarly vibrated. The upper toggle member 11 is pivoted to a block 14 by a pivot screw 15. The block 14 is mounted in a slot 16 formed in the bracket 8. Said block 14 carries lateral wings which extend over the edges of the slot 16, and are provided with slots 17, which receive screws 18. When the screws 18 are loosened, the block 14 may be adjusted vertically, and will carry with it the upper toggle trimming member 11. A screw 19 is threaded into the upper toggle trimming member, and extends through a slot in the block 14. A tension plate 20 is mounted on the shank of the screw 15, and the screw 19 passes through said tension plate. Said tension plate operates to guide the upper toggle trimmer in its vibrations.

The upper toggle trimmer rests directly on the upper surface of the lower trimming member, and said upper toggle trimming member is provided with a blunt surface which operates to brush the material passing between the trimming members, and thus separate the material. The block 14 is moved downward, so as to bring the trimming members into proper coöperation by means of the wedge 21, which has a threaded stem extending through a bearing formed in the upper end of the supporting bracket 8. The lower face of the wedge 21 bears against the upper edge of the block 14. An adjusting nut 22 is threaded on the shank of the wedge 21, and rests against the bearing supporting the wedge 21. By turning the nut 22 in the proper direction, the wedge 21 may be drawn to the right, as viewed in Fig. 3, and will crowd the bearing block 14 downward, thus increasing the pressure between the toggle-trimming members. By turning the adjusting nut 22 in the opposite direction, the wedge may be released, and the pressure between the trimming members likewise released. These parts are constructed in the manner set forth in the patent to Durand, above referred to.

In order to hold the adjusting nut in adjusted position, I have provided the shank of said nut with a ratchet wheel 23, which is rigidly secured to the shank of the adjusting nut. A locking pawl 24 is pivoted at 25 to the bracket 8, and has a hooked nose 26, which engages the teeth of the ratchet wheel and prevents the adjusting nut from turning in a counterclockwise direction, as viewed in Fig. 2. The pawl 24 is held in engagement with the ratchet wheel by a spring 27, which is wound about the shank of the pivot screw for the pawl, and engages the tail of the pawl, and presses the opposite end of the pawl against the ratchet wheel. When it is desired to turn the adjusting nut so as to release the pressure between the toggle members, the tail of the pawl may be pressed, the hooked nose thereof thrown out of the ratchet, and the adjusting nut turned, so as to release the wedge. The ratchet teeth are so constructed that the adjusting nut may be turned in a clockwise direction, so as to increase the pressure between the toggle members and the locking pawl will ride from one tooth to another automatically. It will thus be seen that I have provided means for positively locking the adjusting means so that when the toggle trimming members are adjusted to a desired separating pressure, said members will be locked in said adjusted position. The teeth of the ratchet wheel may also be used as a gage for determining the amount of adjustment, and directions may be given to turn the adjusting nut one or two teeth or notches, when it is desired to secure re-adjustment of the trimming members.

It will be obvious that minor changes in the details of construction may be made, without departing from the spirit of my invention.

Having thus described my invention, what I claim as new and desire to secure by Letters Patent, is:—

1. The combination of trimming members, means for adjusting the position of one trimming member relative to the other including means for holding said trimming members in adjusted position and means for locking said holding means.

2. The combination of trimming members, means for adjusting the position of one trimming member relative to the other and for simultaneously locking and holding said members in their relative adjusted positions.

In testimony whereof I affix my signature, in presence of two witnesses.

JAMES HINKLEY.

Witnesses:
JAMES A. SMEALLIE,
GEO. SCOTT.